March 19, 1946.  H. J. DE N. McCOLLUM  2,396,740
HEATING SYSTEM FOR AIRCRAFT
Filed June 1, 1942
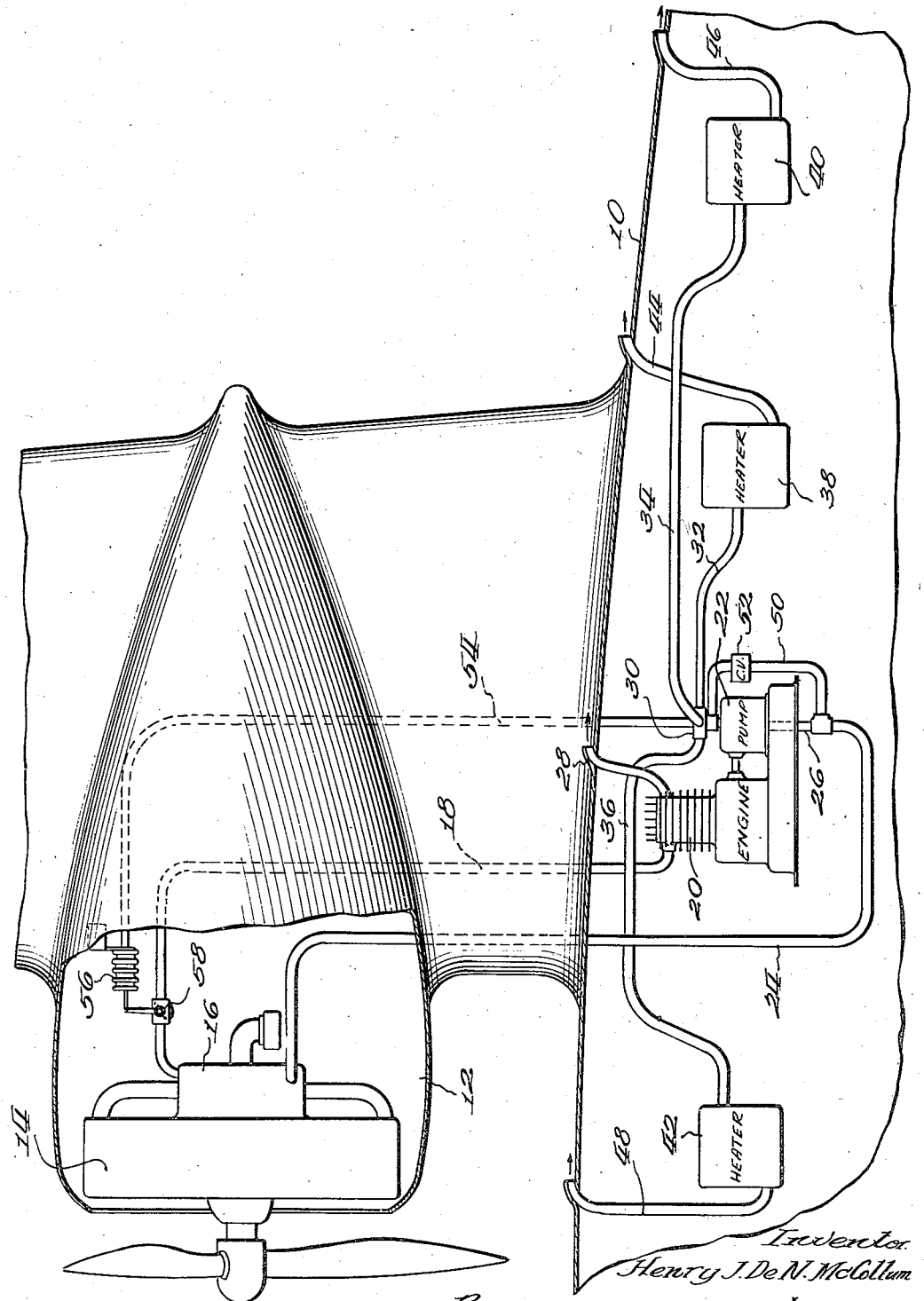
Inventor
Henry J. De N. McCollum
By Williams, Bradbury & Hinkle
Attys Patented Mar. 19, 1946

2,396,740

UNITED STATES PATENT OFFICE 2,396,740

HEATING SYSTEM FOR AIRCRAFT

Henry J. De N. McCollum, Chicago, Ill.; Thelma McCollum executrix of said Henry J. De N. McCollum, deceased Application June 1, 1942, Serial No. 445,311

7 Claims. (Cl. 237—12.3)

My invention pertains to a heating system for aircraft and is more particularly concerned with such a heating system wherein the heater or heaters are of the internal combustion type and utilize the same fuel which is supplied to the airplane engine.

An object of my invention is to provide a heating system for aircraft which is more economical in the consumption of fuel than the heating systems now in use.

Another object of my invention is to provide a heating system for aircraft which is supplied with a combustible mixture from the supercharger of an aircraft engine and which utilizes the fuel thus supplied most economically in heating various parts of the aircraft.

Another object of my invention is to provide an aircraft heating system which is more efficient and more flexible than those now in use.

Other objects and advantages will become apparent as the description proceeds.

The single figure of the drawing is a diagrammatic view illustrating an installation embodying my invention.

In the drawing I have illustrated part of an aircraft, comprising a cabin 10 and an engine cell 12, having a radial engine 14 for driving one of the plane's propellers. The engine 14 is supplied by a supercharger 16 with a combustible mixture of gasoline and air at a pressure greater than atmospheric. The engine and supercharger may be of any conventional or well known type and it will be understood by those skilled in the art that my invention is not limited to a radial or other particular design of engine or to any particular design of supercharger.

Pipe 18 connects the supercharger 16 with the intake port of a small gasoline engine 20, which drives a mixture pump 22 supplied with a combustible mixture from the supercharger 16 by way of pipes 24 and 26. The engine 20 preferably exhausts overboard, as indicated by exhaust outlet 28. The mixture pump 22 compresses the mixture supplied to it from the supercharger 16 and discharges this compressed mixture into a manifold 30 connected by pipes 32, 34 and 36 to heaters 38, 40 and 42, respectively, wherein the combustible mixture is burned and the hot gases pass through a radiator which may or may not be provided with a circulating fan, as is well understood in the art. Each of the heaters exhausts overboard, as indicated by exhaust pipes 44, 46 and 48.

It will be understood by those skilled in the art that the heaters may be of any conventional or usual type of construction and are located at various parts in the interior of the plane. Any desired number of heaters may be connected to the manifold 30 and in current bomber practice the individual heaters are located in the pilot's compartment, the bombardier's compartment, adjacent the various gun positions, and in any or all positions where heat is necessary or desirable any my invention is particularly adapted to permit the maximum flexibility in the location of heaters in bombers or other planes, or in fact in any desired location or locations in any other vehicle.

An important feature of my invention lies in the provision for reducing the fuel consumption of the engine 20 when the pressure developed by the supercharger 16 is adequate to supply the fuel needs of the individual heaters. In order to accomplish this, I have provided a by-pass 50 around the mixture pump 22. This by-pass 50 is provided with a check valve 52 which prevents reverse flow of fluid from the pump outlet to the pump inlet. This check valve may be of any suitable or usual construction, but preferably offers no appreciable resistance to the flow of fluid from the pipe 24 through by-pass 50 to manifold 30.

A pipe 54 connects a manifold 30 with the control diaphragm or Sylphon 56 which regulates the position of a throttle valve 58 in the fuel supply pipe 18 for the engine 20. The diaphragm 56 is so arranged that when the pressure in the manifold 30 reaches a predetermined maximum, the throttle valve 58 is moved to flow-restricting position and reduces the fuel supply to the engine 20 to that amount requisite to permit this engine to idle.

In the operation of my invention, the supercharger 16 is driven by engine 14 and serves to supply that engine with its requirements of combustible mixture. The supercharger 16 also supplies a combustible mixture to engine 20 and to the positive displacement pump 22 driven thereby. Where the pressure developed by the supercharger 16 is not adequate for operation of the heaters 38, 40 and 42, the throttle valve 58 is in fully open position and engine 20 drives pump 22 to increase the pressure at which the combustible mixture is supplied to manifold 30 and the individual heaters connected therewith. Check valve 52 prevents backflow of the combustible mixture from the discharge to the intake side of the pump 22. As the pressure developed by the supercharger 16 increases, the pressure in manifold 30 will increase and valve 58 will shift to a position restricting the flow of fuel to the engine 20. This will reduce the speed of operation of the engine 20 and pump 22 and automatically maintain the desired pressure in the manifold 30 and supply pipes for the various heaters connected therewith.

When the pressure of the combustible mixture supplied by the supercharger 16 is high enough to satisfy the requirements of the individual heaters, further compression of this combustible mixture is unnecessary. Under these conditions, throttle valve 58 is moved to idling position and the combustible mixture supplied by the supercharger by-passes the pump 22 by way of by-pass 50 and check valve 52. Because of the low resistance of the check valve 52, the pressure in the manifold 30 and pipes 32, 34 and 36 is substantially that produced by the supercharger 16. The pump 22 continues to operate slowly, but does not increase the compression of the combustible mixture because of the open by-pass around this pump.

My invention is not limited to the particular arrangement diagrammatically illustrated in the drawing, but may assume numerous other forms. While it is particularly adapted for aircraft and other vehicles, it is not limited to such use but may be utilized anywhere that a supercharger or other source of combustible mixture under pressure is available.

I claim:

1. A heating system for aircraft having a supercharger comprising an internal combustion engine supplied with fuel from said supercharger, a positive displacement pump driven by said engine, means connecting the intake of said pump with said supercharger, a manifold into which said pump discharges, a plurality of heaters connected to said manifold, a throttle valve interposed between said supercharger and said engine, means responsive to the pressure in said manifold for regulating the position of said throttle valve, a by-pass around said pump, and a low pressure check valve in said by-pass for preventing return flow therethrough.

2. A heating system for aircraft having a supercharger comprising an internal combustion engine supplied with fuel from said supercharger, a pump driven by said engine, means connecting the intake of said pump with said supercharger, a manifold into which said pump discharges, a heater connected to said manifold, a throttle valve interposed between said supercharger and said engine, means responsive to the pressure in said manifold for regulating the position of said throttle valve, a by-pass around said pump, and a check valve in said by-pass for preventing return flow therethrough.

3. A heating system for aircraft having a source of combustible fuel under pressure, comprising an internal combustion engine supplied with fuel from said source, a pump driven by said engine, means connecting the intake of said pump with said source, a manifold into which said pump discharges, a plurality of heaters connected to said manifold, a throttle valve interposed between said supercharger and said engine, means responsive to the pressure in said manifold for regulating the position of said throttle valve, a by-pass around said pump, and a low pressure check valve in said by-pass for preventing return flow therethrough.

4. A heating system comprising a supercharger, an internal combustion engine supplied with fuel from said supercharger, a positive displacement pump driven by said engine, means connecting the intake of said pump with said supercharger, a manifold into which said pump discharges, a plurality of heaters connected to said manifold, a by-pass around said pump connecting said supercharger with said manifold, a low pressure check valve in said by-pass for preventing return flow therethrough, and means responsive to the pressure in said manifold for controlling the flow of fuel to said engine.

5. In a heating system of the class described the combination of a source of combustible mixture under pressure, booster means operated by a part of the combustible mixture supplied by said source and serving to increase the pressure of a second part of the combustible mixture supplied by said source, heating means in which said last-named part is burned, automatic means for throttling the flow of fuel to said booster means when the pressure created by said source reaches a predetermined value, and a by-pass around said booster means to supply said second part of the combustible mixture directly to said heating means when the pressure created by said source reaches the predetermined value.

6. In a system of the class described, the combination of a source of combustible mixture under pressure, engine means operated by a part of the combustible mixture supplied by said source, booster means driven by said engine means and serving to increase the pressure of a second part of the combustible mixture supplied by said source, means in which said last-named part is utilized, pressure actuated means responsive to the pressure at the outlet of said booster means and the source pressure for rendering said booster means ineffective when the pressure created by said source reaches a predetermined value and a by-pass around said booster means to supply said second part of the combustible mixture directly to said use means when the pressure created by said source reaches the predetermined value.

7. In a heating system of the class described, the combination of a source of combustible mixture under variable pressure, means for segregating a first part of said mixture, means for segregating a second part of said mixture, engine means operated by said first part, booster means driven by said engine means and serving to increase the pressure of said second part, means in which said second part is utilized, and pressure actuated means for rendering said engine means and booster means ineffective when the pressure created by said source reaches a predetermined value.

HENRY J. DE N. McCOLLUM.